United States Patent
Hawkes et al.

(10) Patent No.: US 9,503,310 B1
(45) Date of Patent: Nov. 22, 2016

(54) METHODS AND SYSTEMS OF DYNAMIC MANAGEMENT OF RESOURCES IN A VIRTUALIZED ENVIRONMENT

(71) Applicant: Leidos, Inc., Reston, VA (US)

(72) Inventors: Kurt R. Hawkes, Oviedo, FL (US); Christina L. Bouwens, Oviedo, FL (US); James E. Shiflett, Oviedo, FL (US); Michael R. Macedonia, Winter Springs, FL (US)

(73) Assignee: Leidos, Inc., Reston, VA (US)

( * ) Notice: Subject to any disclaimer, the term of this patent is extended or adjusted under 35 U.S.C. 154(b) by 180 days.

(21) Appl. No.: 14/082,895

(22) Filed: Nov. 18, 2013

Related U.S. Application Data

(60) Provisional application No. 61/730,191, filed on Nov. 27, 2012.

(51) Int. Cl.
  *H04L 12/24* (2006.01)
  *H04L 12/26* (2006.01)

(52) U.S. Cl.
  CPC .............. *H04L 41/00* (2013.01); *H04L 43/00* (2013.01)

(58) Field of Classification Search
  CPC .............................. H04L 12/26; H04L 12/24
  See application file for complete search history.

(56) References Cited

U.S. PATENT DOCUMENTS

| | | | | |
|---|---|---|---|---|
| 8,176,486 B2 * | 5/2012 | Amir Husain | | 718/1 |
| 2002/0184363 A1 * | 12/2002 | Viavant | | H04L 12/2602 709/224 |
| 2010/0304860 A1 * | 12/2010 | Gault | | A63F 13/10 463/31 |
| 2011/0213886 A1 * | 9/2011 | Kelkar et al. | | 709/226 |
| 2011/0307889 A1 * | 12/2011 | Moriki | | G06F 9/45558 718/1 |
| 2013/0014107 A1 * | 1/2013 | Kirchhofer | | 718/1 |
| 2013/0066945 A1 * | 3/2013 | Das et al. | | 709/203 |

OTHER PUBLICATIONS

Chieu et al., "Dynamic Scaling of Web Applications in a Virtualized Cloud Computing Environment", 2009 IEEE International Conference on e-Business Engineering, pp. 281-286.*

Michael R. Macedonia, et al., "Cloud Simulation Infrastructure—Delivering Simulation From the Cloud," Interservice/Industry Training, Simulation, and Education Conference (I/ITSEC), 10 pp., 2012.

Peter Mell and Timothy Grance, "The NIST Definition of Cloud Computing," National Institute of Standards and Technology, Special Publication 800-145, 7 pp., Sep. 2011, http://csrc.nist.gov/publications/nistpubs/800-145/SP800-145.pdf.

(Continued)

*Primary Examiner* — Kevin Bates
*Assistant Examiner* — Lesa Kennedy
(74) *Attorney, Agent, or Firm* — Dawn-Marie Bey; Bey & Cotropia PLLC

(57) ABSTRACT

The methods and systems described herein centralize simulation resources and effectively delivering training and simulation services to a broad set of distributed users at both the enterprise and operational levels. The cloud-based delivery of simulation applications described herein enables on-demand network access to a shared pool of configurable computing resources (e.g., networks, servers, storage, applications, and services) that can be rapidly provisioned and released with minimal management effort or service provider interaction. In exemplary systems, users may provision computing capabilities, such as server time and network storage, as needed, automatically without requiring human interaction.

10 Claims, 2 Drawing Sheets

(56) References Cited

OTHER PUBLICATIONS

Vivek Kundra, U.S. Chief Information Officer, "Federal Cloud Computing Strategy," 43 pp., Feb. 8, 2011, http://www.cio.gov/documents/federal-cloud-computing-strategy.pdf.

Aliya Sternstein, "Defense Cyber Chief: The Cloud is the Military's Next Internet," Nextgov, 2 pp., Oct. 27, 2011, http://www.nextgov.com/nextgov/ng_20111027_3085.php?oref=rss?zone=NGtoday Barry Rosenberg, "Air Force CIO Pushes for Operational Mindset," Defense Systems Knowledge Technologies and Net-Enabled Warfare, 3 pp., Aug. 9, 2011, http://defensesystems.com/Articles/2011/08/08/Interview-Lt-Gen-William-Lord.aspx?admgarea=DS&Page=1.

Rick Barrett, "State Companies Helping Army With Cloud Computing," Journal Sentinel, 4 pp., May 3, 2012, http://www.jsonline.com/business/state-companies-helping-army-with-cloud-computing-7258roe-150105585.html.

* cited by examiner

METHODS AND SYSTEMS OF DYNAMIC MANAGEMENT OF RESOURCES IN A VIRTUALIZED ENVIRONMENT

CROSS-REFERENCE TO RELATED APPLICATIONS

The present application claims benefit of priority to U.S. Provisional Patent Application No. 61/730,191 entitled METHODS AND SYSTEMS OF DYNAMIC MANAGEMENT OF RESOURCES IN A VIRTUALIZED ENVIRONMENT filed Nov. 27, 2012, the entirety of which is incorporated herein by reference.

FIELD OF THE EMBODIMENTS

The embodiments relate generally to systems and method for dynamically managing the provisioning and allocation of system resources for distributed applications in a virtualized environment.

BACKGROUND

The rapid transition of traditional computer applications to cloud-based computing is beginning to extend to military simulation. Distributing simulation exercises has been common for over a decade, requiring scheduled, dedicated and often temporary infrastructure. However, the ubiquity of the global Internet and advances in mobile computing are allowing the military to reexamine its business model for constructive simulation.

Over the years, the distributed simulation community has vastly expanded modeling and simulation ("M&S") capabilities. For example, interoperability standards have been defined and are currently serving a broad range of users, from high-fidelity virtual simulations (e.g., distributed interactive simulation ("DIS") and high-level architecture ("HLA")) to support for live test and evaluation activities (e.g., test and training enabling architecture ("TENA")). Networks such as the Defense Research and Engineering Network ("DREN") and the Joint Training and Experimentation Network ("JTEN") now allow for coordinated training and testing events, linking locations across the country and the world. Moreover, gaming technology development has led to advances in graphical rendering of simulation environments, highly interactive immersive worlds, and an introduction to new applications for interactive distance learning and highly engaging training environments.

Despite these advances, distributed simulation comes at a technical and operational price that limits its utility in everyday training and experimentation. Because each participating M&S site has to maintain its own facilities and equipment in order to participate in exercises, the cost of facility space, cooling, power and computational hardware is enormous. Computational equipment needs to be installed, upgraded and maintained at multiple sites, which also requires sophisticated tracking to allow interoperability with various participating systems.

Moreover, setup for a particular distributed simulation exercises can take months for coordination and weeks on the ground at various sites for installing and integrating participating simulation systems. Indeed, engineers must travel to each site for exercise support, and significant time and expense is expended retooling and/or reconfiguring existing hardware for different exercise events. Operators, too, have to support the execution of an exercise at each location and they must be available ahead of and during the exercise.

Distributed resources can also lead to less useful simulation exercises. For example, a "fair fight" is difficult to guarantee in training and experimentation in a long-distance environment, because different latencies and computing resources may afford certain users an advantage over others. Additionally, current DIS and HLA models of simulations do not allow for long-duration exercises, because there is no central store or control.

Finally, distributed simulations generally do not support the use of handheld mobile devices. Handhelds such as Android® (Google), iPad® and iPhone® (Apple) phone/tablets have limited computing, memory and battery resources that may be quickly overwhelmed by simulation requirements.

If secure, high-performance, centralized cloud-based simulation could be provided over networks, the utilization of, for example, live, virtual, constructive and gaming ("LVCG") for training could be vastly simplified. For example, centralizing the processing of LVCG in a data center would greatly simplify testing and deploying new hardware that enables the top-flight features of the latest games. Such equipment may only require upgrading at a relatively small set of data centers, and the benefit could extend to all computers connected to the network. Moreover, updating training programs at a data center makes the latest version immediately available to everyone on the network without having to touch each individual computer.

Although cloud-based computing solutions offer the potential of on-demand simulation and training capabilities, simulation applications often require large amounts of computing resources and therefore require virtualization technologies to be able share processor and memory resources and to maximize utilization. The primary challenge in providing cloud-based solutions for simulation applications has been in architecting simulations for virtualization and providing the requisite security for military operations. Currently, operators of simulation applications must make an educated guess as to the level of computing resources needed to be provisioned for successful operation. These resources include, for example, virtual machine ("VM") processor cores and memory. On one hand, if too few resources are provided, the application may not run successfully. This results in a range of problems from inaccurate simulation results to complete application failure. On the other hand, if too many resources are provided, the result is underutilization of underlying system resources, which prevents the maximum number of simulations from running on a given system. Moreover, static allocation solutions do not allow for change in simulation demand during the lifecycle of a simulation.

Accordingly, there is a need in the art for systems and methods for dynamically allocating or provisioning computing resources for applications running in a virtualized environment. It would be beneficial if such solutions could monitor and respond to changing demands of a simulation application running in a VM—rather than just monitoring the state of the VM itself.

SUMMARY OF THE EMBODIMENTS

Exemplary embodiments described herein overcome the above described drawbacks of conventional distributed systems for providing simulations to users. The systems and methods described herein provide cloud-based simulation application solutions that may provision necessary resources using existing VM templates and instanced clones. The systems and methods may further allow for the dynamic adjustment of resources in a virtualized environment based on the monitored health of the simulation application.

A first exemplary embodiment describes a method of provisioning an application on at least one remote user device over a network including a pool of physical and virtual resources. The method includes: receiving, by a first processing server physically located in a first data center, a request to execute a first instance of the application from a first remote user device associated with first data center; determining, by the first processing server, the first resources required to execute the first instance of the application on the first remote user device including a type, number and configuration of the required resources, wherein type is selected from virtual and physical; determining, by the first processing server, availability of the first required resources from the pool of physical and virtual resources, wherein the virtual resources are available from multiple data centers, including the first data center; assigning, by the first processing server, one or more available first physical resources from the first data center to execute the first instance of the application on the first remote user device; assigning, by the first processing server, a first virtual machine template corresponding to the application to one or more first live virtual machines, the one or more first live virtual machines being assigned from one of the multiple data centers in the pool other than the first data center; and launching, by the first processing server, the first instance of the application on the first remote user device over the network, using the assigned one or more first live virtual machines and the assigned one or more first physical resources from the first data center.

A second preferred embodiment describes a process for dynamically managing a pool of virtual and physical resources accessible by multiple tenants running multiple instances of an application. The method includes: monitoring, by at least one processing server in the pool, a processing load of each of the multiple instances of the application running within one or more virtual machines in the pool, the one or more virtual machines each comprising a plurality of nodes; determining, by the at least one processing server, that one or more nodes of the one or more virtual machines is overloaded or underloaded; if overloaded then starting, by the at least one processing server, at least one new virtual machine; and instructing, by the at least one processing server, the one or more multiple instances of the application causing the overload to transfer a portion of its processing load from the one or more overloaded nodes to the at least one new virtual machine; if underloaded then instructing, by the at least one processing server, the one or more multiple instances of the application current underloaded to transfer all of its processing load from the one or more underloaded nodes to one or more alternate nodes; stopping, by the at least one processing server, at one or more of the underloaded nodes.

A third preferred embodiment describes a system for implementing the delivery and management of multiple instances of a distributed application over a network including a shared pool of configurable virtual and physical computing resources to multiple users. The system includes: at least one processing server including a web server application, at least one provisioning application, a virtualization application and the distributed applications for: receiving at the web server application multiple requests for instances of the distributed application from multiple remote user devices; determining, by the at least one provisioning application, the virtual resources required to execute each of the multiple instances of the distributed application on each of the multiple remote user devices including a type, number and configuration of the required virtual resources; determining, by the at least one provisioning application, availability of the required resources from the pool of configurable resources, wherein the required resources are available from multiple data centers; configuring, by the at least one provisioning application, one or more available resources to execute each of the multiple instances of the distribution application on each of the multiple remote user devices; configuring, by the at least one provisioning application, a virtual machine template corresponding to the distribution application to one or more virtual machines; and launching, by the virtual application, each of the multiple instances of the distribution application on each of the multiple remote user devices over the network, using the configured one or more virtual machines.

Additional features and advantages of the embodiments will be set forth in the description which follows, and in part will be apparent from the description. The objectives and other advantages of the embodiments will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the claims.

BRIEF DESCRIPTION OF THE DRAWINGS

The preferred embodiments are illustrated by way of example and are not limited to the following figures.

DETAILED DESCRIPTION

Various embodiments will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments. All terms used herein are intended to have their ordinary meaning in the art unless otherwise provided The methods and systems described herein overcome the current challenges of distributed simulations by centralizing simulation resources and effectively delivering training and simulation services to a broad set of distributed users at both the enterprise and operational levels. The cloud-based delivery of simulation applications described herein enables on-demand network access to a shared pool of configurable computing resources (e.g., networks, servers, storage, applications, and services) that can be rapidly provisioned and released with minimal management effort or service provider interaction. In exemplary systems, users may provision computing capabilities, such as server time and network storage, as needed, automatically without requiring human interaction. Generally, such capabilities may be made available over a network via a thin or thick client platform, and accessed through standard mechanisms.

The systems and methods described herein allow for the pooling of computing resources to serve multiple users using a multi-tenant model, with different physical and virtual resources dynamically assigned and reassigned according to user and application demand. Such computing resources can be elastically provisioned and released, in some cases automatically, to scale rapidly outward and inward commensurate with demand. The resource usage can be monitored, controlled, and reported to provide transparency for both the provider and consumer of the utilized service.

With flexible, scalable environments, ramping up new users and virtual environments may be performed more quickly and at relatively modest cost, resulting in faster implementation. In addition, the environment can scale according to need, increasing in size as expanded capability is needed, decreasing when needs are reduced—with overall ability to adapt in environments of sporadic use. This provides an environment that is device and location independent, expanding the accessibility of the resources. Together this provides for increased collaboration amongst the users of the environment—with common access to the same resources. Updates to the resources provide all the users with access to the same capabilities.

Figure 1:
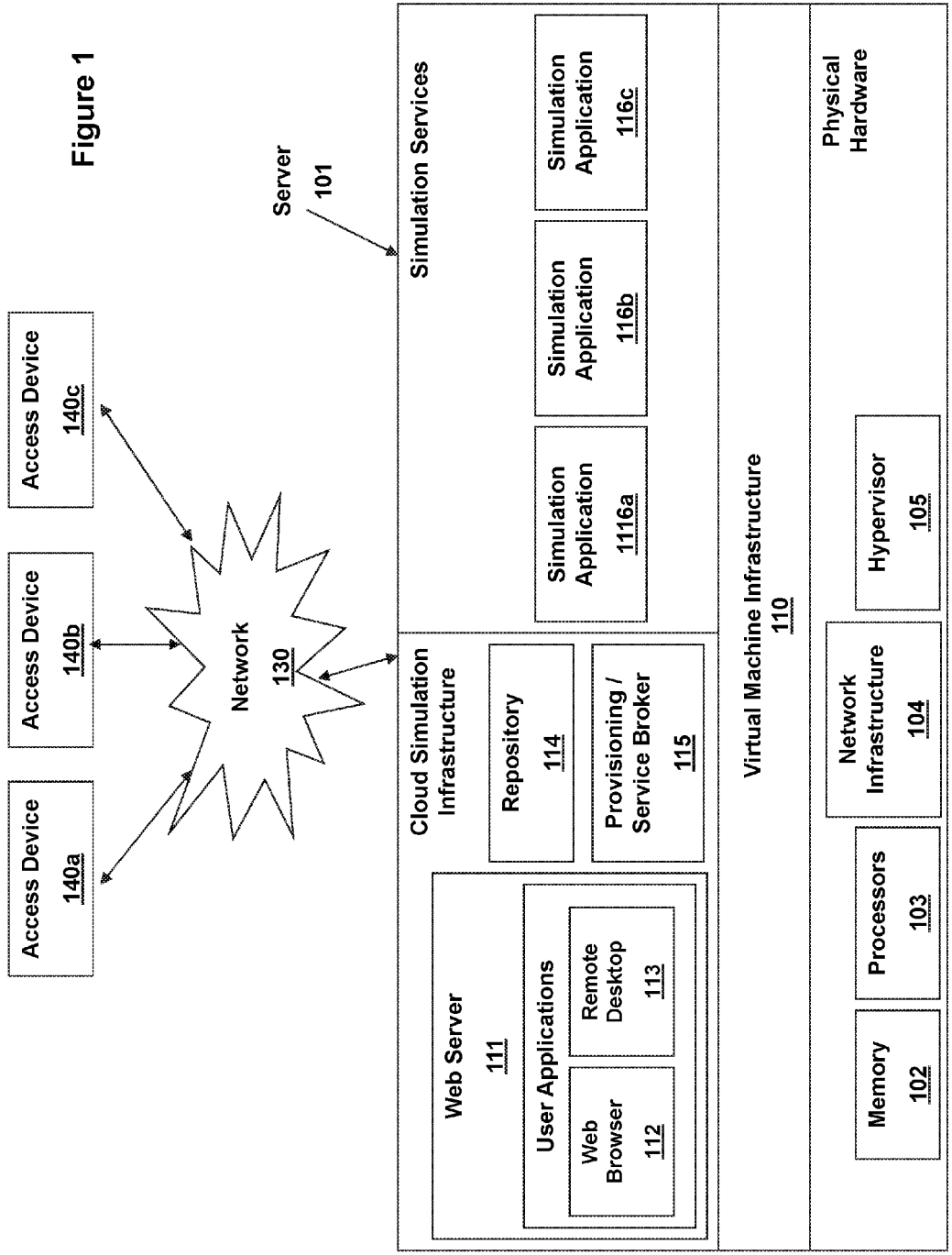
FIG. 1 illustrates an exemplary system for providing dynamic virtual resource management based on distributed simulation application health.

Referring to FIG. 1, an exemplary system for providing dynamic virtual resource management based on distributed simulation application health is illustrated. As shown, the server 101 may include host physical hardware (i.e., a server) in communication with one or more user systems (i.e., access devices 140a, 140b, 140c) via a network 130.

In one embodiment, the system includes a server 101 comprising, for example, any number of CPUs (processors) 103, memory 102 and network infrastructure hardware 104 for hosting any number of simulation applications (116a, 116b, 116c) and allowing an access device (140a, 140b, 140c) to access, control and/or interact with the same. It will be appreciated that although a single server is illustrated, any number of servers, each comprising multiple CPU cores and memory may be employed, and these systems may be in communication with each other via a wired or wireless network.

The server 101 will typically employ virtualization infrastructure 110 for hosting a distributed application, such as a simulation application (116a, 116b, 116c). Generally, the main components to virtualization include one or more hypervisors (hosts) 105, network infrastructure, and storage (persistent memory). A hypervisor 105 provides the main computing services (or CPUs) and short term memory (RAM) for virtualized systems. For example, the hypervisor 105 may present a virtual operating platform (e.g., VM) to a guest operating system and may manage the execution of the same. The hypervisor 105 may comprise computer software, firmware and/or hardware that creates and runs the virtualized environment at the server.

Generally, VMs allow simulation application software to execute as if it were running directly on the physical hardware, but access to physical system resources (e.g., network access, display, i/o devices, storage) is managed by the hypervisor, rather than the host hardware. Accordingly, users may be limited to a subset of the server's resources, as software running within a VM is limited to the resources and abstraction provided by the VM. Moreover, the virtualization infrastructure 110 may allow for data redundancy and failover, for example, faults in individual VMs may be isolated to avoid interruption of the overall exercise.

The system may employ one or more commercially available products to provide virtualization infrastructure 110. In one embodiment, VMware vSphere® hypervisors allows for access to each VM and control of the environment; VMware vCenter® allows for the management of multiple VMs; and VMware View Server® allows for remote access to a virtualized environment. Of course, the instantly described systems may be compatible with other virtual infrastructure software (e.g., Citrix software) as desired or required.

As shown, system memory 102 provides the physical drive space that each virtualized system/application operates out of. Such storage may be in the form of a hard drive, external drive, flash memory, or the like. As discussed above, a hypervisor 105 may allocate the necessary storage for each VM.

The network infrastructure 104 may provide both the virtualized network for the VMs to communicate between themselves and may include the network infrastructure for user systems to communicate with the virtualized environment.

Referring still to FIG. 1, the Simulation Services component contains the actual simulation application software (116a, 116b, 116c) for creating the simulation services being delivered. These simulations can interact locally with other locally hosted simulations or may connect to user access devices (140a, 140b, 140c) via the network 130. Accordingly, the simulation services may be in communication with external systems, such as one or more user access devices.

M&S applications are particularly suited to be executed by the exemplary system. M&S applications typically use virtualized hardware more extensively for prolonged periods of time than most applications and require more memory, intensive CPU usage, minimum CPU counts per node, multiple distributed nodes, and a low latency/high bandwidth network. During execution of an M&S simulation, the demand on virtualized hardware is typically sustained at a high load for significant portions of the simulation exercise.

One particular M&S application worth mention is the One Semi-Automated Forces (OneSAF®) application, the Army's next-generation entity-level simulation that provides a composable, distributed and scalable simulation of real-world battlefield situations using validated physical models and doctrinally correct behavior models. OneSAF® supports analysis, acquisition, planning, testing, training, and experimentation.

As shown, one or more VMs running on the server 101 may be configured to behave as a web server 111 to provide user interface web pages via web browser 112 and/or remote desktop service 113. A web browser 112 may be accessible to a user access device (140a, 140b, 140c) and may allow a user to login, configure, select, and/or execute the desired simulation application (116a, 116b, 116c). In one specific embodiment, the web server VM may run Apache Tomcat™, which is an open source software implementation of the Java Servlet and JavaServer Pages technologies.

The system may also include a repository server 114, which may comprise a VM running on the host server 101 and configured to determine and store the current state of the system. This state information may be used by the web server 111 to provide details to users of the system.

The system may also include a modular provisioning/service broker server 115. In one embodiment, each application to be supported by the system (116a, 116b, 116c) may be added to the service broker server 115 as a new plugin module (discussed in detail below), and each plugin module may be adapted to provision and monitor a specific application.

As an example, a plugin module may be created and added to the service broker 115 for a simulation application 116a, such as but not limited to the OneSAF® application. The service broker 115 may communicate with the simulation application 116a via a gateway, which allows the service broker to feed the application with control commands from the user interface 112—allowing a user to configure, initialize and execute a scenario. This also allows the provisioning and configuration of VMs for use in a user designated configuration and exercise.

As shown, any number of users may access the system using an access device (140a, 140b, 140c) in communication with the server 101. An access device may be any electronic device capable of processing data to access a simulation application running on server(s) (including processors, software, etc.), such as but not limited to a personal computer, general computer or special purpose computer, cellular or mobile phone, personal digital assistant (PDA), tablet computer, wireless device, video phone, smart phone, or any other. The access device (140a, 140b, 140c) and server 101 can communicate via electronic transmissions through communication networks 130 such as the Internet, intranets, wireless networks, Bluetooth networks, fiber optic networks, existing telephone networks, and other networks. Exemplary networks such as the DREN the JTEN may be utilized.

It will be understood that the access device may be portable or may be physically located at a site of a military or civilian organization, a user's home, or any location where the device can be connected to a network. For example, a mobile smart phone or tablet may access the network at nearly any location in world.

The access device (140a, 140b, 140c) will generally include four components: (a) a processing component, (b) a memory component, (c) an input component, and (d) a display component. The processing component can include a computer processor necessary for handling the computations, processing, and other functionality of the device. The display can be a LCD, LED, OLED, CRT, 3D or stereoscopic screens, projectors, or any other type of display. The display component can be a screen capable of touch screen input. In one example, the display component, input component, and processing component may be combined into a single touchpoint device to allow a user to enter information by touching the screen of the touchpoint device. As a result, the screen acts as the input component. Alternatively, the device can receive input from an input component instead of or in addition to a touch screen capability. Exemplary input devices may include, for example, buttons, switches, dials, sliders, keys or a keypad, a navigation pad, touch pad, touch screen, mouse, trackball, stylus, and the like, any of which can be integrated in the device or electrically coupled thereto.

Optional enhancements to the access device can add additional service features or maintain a secure session with the user. In certain embodiments, peripheral devices may be connected to, or integrated in, an access device to enhance a user's experience. The peripheral devices may be connected through the network 130, though they may also be physically connected or even connected via a different network. Exemplary peripheral devices may include video cameras, display devices, speakers, processors (along with software to carry out the process), input devices, biometric devices (e.g., for fingerprints, iris scan, facial recognition, voice recognition), printers, scanners, deposit/dispense devices, card readers, bar code readers (including QR code readers), PIN pads/electronic signature capture, remote camera controls, and other devices without limitation.

Figure 2:
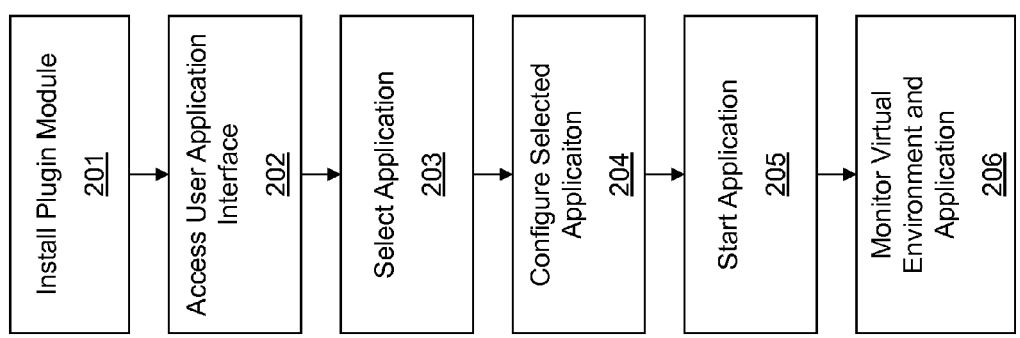
FIG. 2 illustrates an exemplary method for accessing, configuring, executing and monitoring a simulation using the exemplary system of FIG. 1.

Referring to FIG. 2, an exemplary method for provisioning and monitoring a simulation exercise is shown that uses the exemplary system of FIG. 1. It will be recognized that the exemplary method of FIG. 2 may be executed in a number of ways, and the following description should not be limited to a particular order. In this example, a user can interact with an access device to configure, select, and experience a simulation exercise running on a remote server.

At 201, an application-specific plugin module may be installed on the server (e.g., the provisioning/service Broker server (FIG. 1 at 115) during a setup procedure. Each application to be deployed (or provisioned) may be initially installed and configured into one or more VMs during a setup procedure. The VMs may then be configured as VM templates within the virtualization infrastructure, such that they can be cloned and new instances of the simulation application can quickly be run in the future. In this way, an application may be distributed over any number of VMs.

Generally, a plugin module for a particular simulation application (e.g., OneSAF®) may contain the settings and configuration necessary to affect one or more of the following:
(1) locate the appropriate VM template(s) for the plugin application,
(2) clone the VM template(s) to live VMs,
(3) create virtual networks for the distributed nature of the application,
(4) configure the VMs for the created virtual network,
(5) boot the VMs,
(6) monitor the boot process,
(7) configure the VM virtual network cards for the newly created VM network, and
(8) configure and launch the application itself within the VM.

This process may be defined in the plugin module for a particular application, and the plugin may execute and monitor the provision for each instance of the application started. It will be appreciated that the plugin module installation may only be required for initial system setup. Moreover, each application may require installation of its own separate plugin module.

At step 202, a user's access device may access a user application interface of the system. The interface may comprise a zero (e.g., VMware View® client), thin (web applications, mobile applications) and/or thick client interface that allows a user to select an application and interact with the same using an access device. In certain embodiments, the user may be asked to enter identification information and/or other security credentials before access is granted to the system.

A verified user may next select an application to run 203. For example, a user may be provided with a list of available applications, and may select a simulation application from the list.

Once the user selects an application, he may then configure the application 204 before its execution on the server. For example, a user who selects the OneSAF® application may be presented with an exercise catalog via the user's web browser. The exercise catalog may present a user a choice of pre-defined exercises to be run by a simulation. Alternatively or additionally, a user may create a new exercise or upload a stored exercise through the displayed website. A scenario or service catalog may also be accessible via a web page presented to a user, and a list of scenarios may be selected. The scenarios can be loaded into the selected simulation exercise configuration or a new scenario may be created or uploaded such that other users may select it.

In any event, once the simulation application is configured 204, the user may initialize the above described plugin deployment process by, for example, pressing a start button presented within the user interface 205. The system may determine the required virtual resources to run the selected application (as configured by the user), and may automatically provision those resources.

The execution of the application on the server may produce a feed displayed on the access device showing the simulation exercise and allowing the user to interact with the same. The video feed may include full duplex video and audio at a sustained rate, as an example, of 30 frames (60 fields) per second fully interlaced in both point-to-point and multipoint environments. Additionally, the audio and video may be provided to the user in separate streams which are synchronized at the access device. The video may be presented to the user of an access device in a stand alone window or may be fully integrated into the graphical user interface ("GUI") of the device.

Once the application has been provisioned (deployed), the application and virtual environment may then be monitored 206, for example by the plugin module or other software. First, the virtualization infrastructure may allow for virtual environment monitoring, wherein the performance of each individual VM (or a group of VMs) may be determined. The virtual resources allocated to a particular instance of a simulation application may be dynamically adjusted (increased or decreased) based on the status of the virtualized environment (i.e., VMs).

However, monitoring of the one or more VMs alone will not necessarily ensure proper virtual resource allocation. It is possible for the simulation application to be overloaded on a node, without utilizing that node's CPU at 100%. For example, if the application requires more lookups within a particular time period than can be performed by a hardware configuration in that period, this may be due to hardware other than the CPU. If only the CPUs of the VMs are monitored, additional resources may not be allocated in this situation.

Accordingly, certain exemplary systems allow for monitoring of the simulation application itself, rather than simply monitoring the virtual environment. If the system detects that the application requires additional resources, those additional resources may be deployed. Similarly, if the system detects that the application is idle or does not require the allocated resources, a portion of those resources may be reallocated to other applications.

In the case of the OneSAF® plugin example, a plugin module may monitor the OneSAF® application for a "gasp" condition. Simulation events are typically grouped into "buckets" based upon the frequency that those events occur, and as time advances in a simulation, all events in the "bucket" for that time period and any pending incident-based events are executed. A gasp condition occurs when the simulation is incapable of completing the calculations for that time period without overloading a virtual CPU of a VM. This can occur due to the fact that certain parts of the application cannot be parallelized.

For example, one CPU in a VM might be accessing data from an environmental database, which locks other CPUs out of the same environment lookup for the duration of the first lookup. Those other CPUs enter a wait state until they are clear to enter the database to perform their tasks. This "wait" does not show up as a busy CPU, but rather the CPU appears to be idle. Any system that only monitors the overall state of the VM would not detect an overloaded application since the application did not overload all CPUs.

In order to monitor the health of a virtualized application, the application may be extended when it is virtualized. In the case of the OneSAF® simulation, the application includes an extension framework. When the OneSAF® application loads, a plugin module may open and maintain a connection with this extension. The extension can then report back to the server the current health of the simulation. When a node within the OneSAF® distributed application gasps, the condition may be reported to the server. If the gasping reaches a certain threshold, the server can respond by, for example, starting another VM for the application. Once started, the application may be loaded within the new VM, and the plugin module can instruct the application to transfer a portion of the processing load from the node that is gasping to the newly started node. This process may be employed without the need of user intervention.

Accordingly, the environment can dynamically scale according to need, increasing in size as expanded capability is needed, and decreasing when needs are reduced—with overall ability to adapt in environments of sporadic use. This provides an environment that is device and location independent, expanding the accessibility of the resources.

Results of the simulation exercise may be recorded and stored in a database on the server. Stored simulations may be accessed by the user at a future time and from the same or a different access device for training purposes.

Although the embodiments are described herein in the context of simulation applications, it will be appreciated that they are not so limited, and may be applicable to any application capable of operating in a distributed computing environment (i.e., across multiple computing nodes). Exemplary applications include online games and other simulations capable of being virtualized.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this embodiment.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope hereof.

We claim:

1. A method of provisioning and monitoring a distributable simulation application on at least one remote user device over a network including a pool of physical and virtual resources comprising:
    accepting, by a first processing server physically located in a first data center, a plugin module specific to the distributable simulation application;
    configuring, by the first plugin module, the distributable simulation application into at least one virtual machine template;
    receiving, by the first plugin module of the first processing server, a request to execute a first instance of the distributable simulation application from a first remote user device associated with first data center;
    determining, by the first plugin module of the first processing server, the first resources required to execute the first instance of the distributable simulation application on the first remote user device including a type, number and configuration of the required resources, wherein type is selected from virtual and physical;
    determining, by the first plugin module of the first processing server, availability of the first required resources from the pool of physical and virtual resources, wherein the virtual resources are available from multiple data centers, including the first data center;
    assigning, by the first plugin module of the first processing server, one or more available first physical resources from the first data center to execute the first instance of the distributable simulation application on the first remote user device;
    assigning, by the first plugin module of the first processing server, a first virtual machine template corresponding to the at least one virtual machine template of the distributable simulation application to one or more first live virtual machines, the one or more first live virtual machines being assigned from one of the multiple data centers in the pool other than the first data center;
    launching, by the first plugin module of the first processing server, the first instance of the distributable simulation application on the first remote user device over the network, using the assigned one or more first live virtual machines and the assigned one or more first physical resources from the first data center;
    monitoring by the first plugin module of the first processing server a status of the assigned one or more first live virtual machines and the assigned first one or more physical resources to determine level of performance and adjusting the assigned one or more first live virtual machines and the assigned first one or more physical resources accordingly; and
    monitoring by the first plugin module of the first processing server a status of the first instance of the distributable simulation application running on the first remote user device and adjusting the assigned one or more first live virtual machines and the assigned first one or more physical resources accordingly, wherein the monitoring by the first plug in module of the first processing server of the first instance of the application is initiated by launching a first extension framework module by the first instance of the application, wherein the first extension framework module facilitates reporting of status of the first instance back to the plugin module of the first processing server and further wherein monitoring a status of the first instance of the distributable simulation application includes monitoring the health of the instance of the distributable simulation application including gasp conditions.

2. The method according to claim 1, further comprising:
    accepting, by a second processing server physically located in a second data center remote from the first data center, a second plugin module specific to the distributable simulation application;
    installing and configuring, by the second plugin module, the distributable simulation application into at least one virtual machine template;
    receiving, by a the second plugin module of the second processing server, a request to execute a second instance of the distributable simulation application from a second remote user device associated with second data center, wherein the request from the second remote user device is received while the first instance of the distributable simulation application is running on the first remote user device;
    determining, by the second plugin module of the second processing server, the second resources required to execute the second instance of the distributable simulation application on the second remote user device including a type, number and configuration of the second required resources, wherein type is selected from virtual and physical;

determining, by the second plugin module of the second processing server, availability of the second required resources from the pool of physical and virtual resources, wherein the virtual resources are available from multiple data centers, including the first data center and the second data center;

assigning, by the second plugin module of the second processing server, one or more available second physical resources from the second data center to execute the second instance of the distributable simulation application on the second remote user device;

assigning, by the second processing server, a second virtual machine template corresponding to the distributable simulation application to one or more second live virtual machines, the one or more second live virtual machines being assigned from one of the multiple data centers in the pool; and launching, by the second plugin module of the second processing server, the second instance of the distributable simulation application on the second remote user device over the network while the first instance of the application is running on the first remote user device, using the assigned one or more second live virtual machines from one of the multiple data centers and the assigned second one or more physical resources from the second data center.

3. The method according to claim 2, further comprising:

monitoring by the second plugin module of the second processing server a status of the assigned one or more second live virtual machines and the assigned second one or more physical resources to determine level of performance and adjusting the assigned one or more second live virtual machines and the assigned second one or more physical resources accordingly; and monitoring by the second plugin module of the second processing server a status of the second instance of the distributable simulation application running on the second remote user device and adjusting the assigned one or more second live virtual machines and the assigned second one or more physical resources accordingly.

4. The method according to claim 3, wherein monitoring the status of the first and second instance of the distributable simulation application includes determining for each of the first and second instances a status causing a limitation of distributable simulation application objectives or excess processing capacity to occur during each of the first and second instances.

5. The method according to claim 2, wherein the first and second remote user devices are mobiles devices.

6. The method according to claim 3, wherein the monitoring by the second plugin module of the second processing server of the second instance of the application is initiated by launching a second extension framework module by the second instance of the application, wherein the second extension framework module facilitates reporting of status of the second instance back to the second processing server.

7. The method according to claim 1, wherein the first extension framework module provides transfer instructions for adjusting the assigned one or more first live virtual machines responsive to the reported status of the first instance of the application.

8. The method according to claim 7, wherein the transfer instructions include instructing by the first plugin module the distributable simulation application to transfer a portion of a first instance processing load to a new first live virtual machine.

9. The method according to claim 6, wherein the second extension framework module provides transfer instructions for adjusting the assigned one or more second live virtual machines responsive to the reported status of the second instance of the application.

10. The method according to claim 9, wherein the transfer instructions include instructing by the second plugin module the distributable simulation application to transfer a portion of a second instance processing load to a new second live virtual machine.

* * * * *